United States Patent
Sandberg et al.

[11] Patent Number: 6,150,986
[45] Date of Patent: Nov. 21, 2000

[54] ANTENNA SYSTEM COMPRISING DRIVER CIRCUITS FOR TRANSPONDER

[75] Inventors: Ola Sandberg, Stockholm; Lars Andersson, Sodertalje, both of Sweden

[73] Assignee: Alfa Laval Agri AB, Tumba, Sweden

[21] Appl. No.: 09/029,005

[22] PCT Filed: Aug. 15, 1996

[86] PCT No.: PCT/SE96/01015

§ 371 Date: Jun. 15, 1998

§ 102(e) Date: Jun. 15, 1998

[87] PCT Pub. No.: WO97/07414

PCT Pub. Date: Feb. 27, 1997

[30] Foreign Application Priority Data

Aug. 16, 1995 [SE] Sweden ................................. 9502856

[51] Int. Cl.$^7$ .............................. H04B 7/00; G08B 13/24
[52] U.S. Cl. ................... 343/742; 340/825; 340/825.54; 340/572
[58] Field of Search ..................................... 343/742, 751, 343/867; 340/572; 235/92 MS, 92 PL; 119/1

[56] References Cited

U.S. PATENT DOCUMENTS

| | | | |
|---|---|---|---|
| 4,247,758 | 1/1981 | Rodrain | 235/92 MS |
| 4,274,089 | 6/1981 | Giles | 340/572 |
| 4,798,175 | 1/1989 | Townsend et al. | 119/155 |
| 5,191,349 | 3/1993 | Dinsmore et al. | 343/751 |
| 5,258,766 | 11/1993 | Murdoch | 343/742 |
| 5,281,941 | 1/1994 | Bernstein | 336/188 |
| 5,592,182 | 1/1997 | Yao et al. | 343/742 |
| 5,699,048 | 12/1997 | Galloway | 340/572 |

FOREIGN PATENT DOCUMENTS

| | | |
|---|---|---|
| 494764A1 | 1/1992 | European Pat. Off. . |
| 496610A2 | 1/1992 | European Pat. Off. . |
| 4213065 | 10/1993 | Germany . |
| 9214307 | 8/1992 | Sweden . |

*Primary Examiner*—Don Wong
*Assistant Examiner*—James Clinger
*Attorney, Agent, or Firm*—Hovey, Williams, Timmons & Collins

[57] ABSTRACT

A transponder for, for example, domestic animals can receive high frequency energy and transmit information of an antenna ($L_x$, $L_y$, $L_z$) and has a storage capacitor ($C_5$) for storing received energy, which is used for transmitting on the antenna. In order to make the antenna less sensitive to the geometric direction of the received high frequency energy, it has a plurality of antenna coils ($L_x$, $L_y$, $L_z$), that are arranged in an angle to each other, e.g. perpendicularly to each other. Monitoring circuits ($LD_x$, $LD_y$, $LD_z$, 1) can detect the energy received on each coil and compare the detected values to each other and can, for issuing information, use that coil on which the largest energy has been received. Thereby, the transmission can be made in a direction which is considerably more optimal than a direction which otherwise would be obtained in a more random fashion. Each antenna portion is further included in an oscillatory circuit having two different natural frequencies. Thereby information of the transponder can be issued by modulating between these frequencies, what produces a transmission that is more free from interference compared to the case where only one frequency is used with on/off-modulation.

22 Claims, 2 Drawing Sheets

ANTENNA SYSTEM COMPRISING DRIVER CIRCUITS FOR TRANSPONDER

BACKGROUND OF THE INVENTION

1. Field of the Invention

The present invention relates to a transponder, in particular an antenna system for a transponder and activation or driver circuits incorporated in the transponder for issuing information carrying electromagnetic waves on the antenna system.

2. Description of the Prior Art

Electronic systems for identification of domestic animals utilize electronic units attached to the animals, usually in the shape of transponders that lack an energy source of their own. Such transponders obtain induced electric energy from receiving suitable electromagnetic energy that is emitted by antennas or coils located at those positions where an identification is desired, such as at the entrance of a feeding place or a milking station. After receiving induced energy the transponder issues a radio frequency signal that is captured by an antenna which can be the same antenna by means of which the energy was induced or at least is arranged in parallel therewith. The identification signal can then be used for e.g. only counting the number of animals, controlling amounts of delivered food, guiding a milking animal to the correct stall, etc.

Transponders are generally used for identification of movable objects, for example and primarily of bovine animals. A transponder comprises conventionally a receiving and transmitting antenna, a storage means for storing energy transferred wirelessly to the transponder and control circuits. A transponder is associated with at least one usually fixed or stationary reading station that comprises an antenna loop having one or more turns located at some position, in the direct neighbourhood of which the movable object is sometimes located or passes, such as for example directly through the antenna loop of the reading station. The antenna of the transponder is in a similar way made as a coil having a multitude of turns, the coil being substantially flat. The antenna of the transponder and the antenna in the reading station cooperate in principally the same way as the two windings of a transformer having an air core. By suitable arrangements it can often be achieved that these two coils at least sometimes will be located approximately in parallel with each other, when the movable object is staying close to or passes the stationary reading station, but this can be difficult to achieve in a secure manner, e.g. for the case where the reading station comprises loops located at each side of a passage through which the movable objects pass. Thus, it would be advantageous that the antenna system comprising the two antennas could be arranged for arbitrary mutual directions of the magnetic field of the stationary antenna in the reading station and the antenna of the transponder.

U.S. Pat. Nos. 4,247,758 and 4,798,175 and the published European patent applications EP-A1 0 494 764 and EP-A2 0 496 610 disclose typical examples of prior transponder systems and antennas designed therefor.

In U.S. Pat. No. 4,274,089 it is disclosed how an interrogation system for theft protection responders can be designed to have two transmission antennas, each one of which being a flat coil and which are located perpendicularly to each other. These antenna coils are made having only one terminal and thus they have one end open. They are supplied with electrical energy alternatingly so that always only one antenna is active. A separate receiving antenna is used. By the arrangement comprising antenna coils arranged perpendicularly to each other the station is less sensitive to the orientation of the antenna of a responder attached to some object that passes the interrogation station.

This previously known design having two antenna elements arranged perpendicularly to each other can of course also be modified for use in reading stations for transponders, as appears from the published European patent application EP-A1 0 496 609. Here two vertical antenna coils that are perpendicular to each other are provided surrounding the path along which a transponder passes. U.S. Pat. No. 5,258,766 discloses a similar way of accomplishing that the antenna system in a transponder/reading station installation will have the quality mentioned above, i.e. that a good transfer of energy and of information is obtained for arbitrary angles of the two antennas. The reading station is here provided with three antenna loops located perpendicularly to each other. In addition, each antenna loop consists of two parallel portions located at a distance from each other so that a cubical or complex, ball shaped arrangement is obtained, where in the cubical arrangement antenna conductors are located at all edge lines of the cube.

Antennas of reading stations are usually made in the shape of a portal structure, see for example the patent U.S. Pat. No. 4,798,175 cited above. The electrical conductor in the antenna here forms loops located at each side of a passage through which the animal are intended to pass. Such a portal structure could be completed to comprise an antenna arrangement that is previously known according to the discussion above having antenna loops located above and underneath the passage and further having loop elements through which the animal must pass, in order to produce a more secure transfer of energy and more secure receiving of information. However, the antenna arrangement must be made very sturdy or robust having the electrical conductors of the antenna attached to some electrically isolating material, that in the prior design comprises curtains suspended at the sides of the passage and consisting of thick plastic plates. The plastics material must here be selected to have such a thickness and such a quality that it is opaque, and thus the portal will have the appearance of a dark passage or dark opening. Bovine animals can be afraid of such a dark passage and special arrangements must be made for making them pass through the portal. If the prior portal is completed to comprise further parts it would be even clumsier and heavier and it must be designed to include rigid steel parts provided with a suitable electrical isolation. For a reading station for bovine animals where it is desired that the animals to which the transponders are attached at their passage preferably are to pass through or close to an antenna loop of the reading station, the antenna loop should thus be designed in the simplest possible way, having the most possible open configuration. Apparently, such an open configuration cannot be obtained using the prior antenna systems.

A transponder comprises conventionally an oscillatory circuit, in which the antenna coil and a capacitor are included and which is coupled to a capacitor for storing energy, see the published European patent application EP-A1 0 301 127 and the German patent documents DE-C1 40 04 801 and DE-C1 40 04 196. The oscillatory circuit is tuned to the frequency of the electromagnetic energy that is issued from a reading station together with which the transponder is intended to be used, and the oscillatory circuit is through some suitable rectifying device further coupled to a capacitor for storing energy. When sufficient energy has been received and stored in the storage capacitor, it provides supply voltage to control circuits so that information can be issued from the transponder antenna, generally having the same frequency as the received electromagnetic energy. Then the oscillatory circuit can be made to oscillate at its natural or resonant frequency by connecting it to the electrodes of the storage capacitor during short periods at suitable times, see the European patent application EP-A1 0 301 127 cited above. The times can be selected so that they occur at every second cycle of the natural oscillation of the oscillatory circuit, see the divider circuit 158 and the monostable flipflop 192 in FIG. 2. Information from the transponder is then emitted by modulating the transmitted wave in an off-and-on fashion. In order to obtain a safe reception it is required that the reading station issues the high frequency energy in intervals or periodically, so that after a transmission interval a transponder that is located within a certain distance from the antenna reading distance normally has had its storage capacitor charged to a sufficient voltage in order to drive its control circuits and in order to be able to transmit information.

In another design the information issued from the transponder can be carried by an electromagnetic oscillating wave having a frequency different from that of the received high frequency energy, see the German "Offenlegungsschrift" DE-A1 42 13 065. Thereby possibly high frequency can be transmitted more continuously and perhaps longer transmission periods of the transponder can be obtained.

However, a disadvantage in these known designs is that in emitting information from the transponder the modulation is made by means of an "on/off" process which is known to be sensitive to interference and can require several retransmissions of information in order that it will be safely received.

SUMMARY OF THE INVENTION

It is an object of the invention to provide a transponder and an antenna system for a transponder achieving that the reading of the transponder is secure when it passes a reading station.

It is another object to provide a transponder and an antenna for a transponder that can be used for arbitrary locations and directions of the antenna in a reading station.

A problem that the invention intends to solve is according to the discussion above to provide a transponder and an antenna system for a transponder which can be used together with existing antennas in reading stations without having to change these antennas and which achieve a good transfer of electromagnetic energy to and of information carried by electromagnetic waves from the antenna of the transponder.

It is another object of the invention to provide a transponder that can perform transmission of information in a way that can be securely detected by a reading station.

Another problem that the invention intends to solve is thus to provide a transponder which issues electromagnetic radiation in such a way that the information content of the radiation can be securely detected by a receiving station.

A transponder for e.g. domestic animals can in the usual way receive high frequency energy and transmit information on an antenna and has a storage capacitor for storing received energy that is used when transmitting on the antenna. In order to make the antenna less sensitive to the geometric direction of the received high frequency it has a plurality of antenna coils located in an angle to each other, for example perpendicularly to each other. Each such antenna coil operates independently of the other antenna coils and is thus tuned to the frequency of the wirelessly received high frequency energy, or worded in a more accurate way, is included in an oscillating circuit tuned to this frequency. This means that the natural oscillation frequency or the resonance frequency of the oscillatory circuit approximately agrees with the frequency of the high frequency energy. Further, each antenna portion is connected to a storage capacitor for storing high frequency energy, the storage capacitor advantageously being common to all antenna portions.

Monitoring circuits can detect the energy received on each coil and compare the detective values to each other, and can, for transmitting information, use that coil on which the largest energy has been received. Thereby the transmission can be made in a direction that is significantly more optimal than a more random direction otherwise obtained.

The antenna arrangement of the transponder is geometrically similar to the antenna system of the reading station according to the European patent application 0 496 609 cited above. However, it is significantly simpler than the more complicated ball configuration that also according to the discussion above is known for the stationary reading station. The latter antenna configuration thus comprises two loop portions parallel to each other for each perpendicular direction, whereas the antenna of the transponder only has to comprise simple, substantially flat loops, which are located perpendicularly and symmetrically in relation to each other, so that a simpler or more genuine ball configuration is obtained.

In the German patent application known through "Offenlegungsschrift" DE-A1 42 13 065 a self identifying telemetric device is disclosed, that in the discussion of the problem presented in that application is proposed to comprise two antenna portions $L_{o1}$ and $L_{o2}$ which are arranged perpendicularly to each other. However, these two antenna portions have different resonant frequencies and are thus intended for receiving electromagnetic radiation of different wavelengths. Apparently such a construction does not improve the reception for different angular positions of the transponder antenna for a considered wavelength. In this prior design further the antenna portions are joined by means of a ferrite core, whereas in the antenna arrangement for a transponder, which has been described above, no core elements are required.

A transponder for receiving wirelessly transferred high frequency energy and for transmitting wirelessly information thus comprises an antenna for receiving and transmitting, an energy storage unit connected to the antenna for storing energy and a control and transmission unit which is arranged to transfer an information signal to the antenna, so that the signal is emitted from or on the antenna by means of energy stored in the energy storage unit. In order to achieve better receiving and in particular better transmitting the antenna comprises at least two separate antenna portions that each one is arranged for wireless receiving and transmitting and each one in the conventional way has a direction in which the efficiency in receiving is at a maximum. These directions are arranged in considerable angles in relation to each other, in particular substantially 90°, and should always be comprised within the interval between 60° and 120°. In order to achieve a suitable symmetry preferably three such separate antenna portions are provided having directions for maximum receiving and these directions are all oriented in substantially the angle of 90° in relation to each other.

Each antenna portion can in a simple embodiment comprise a winded coil, the winding turns of which all are located in planes that are essentially parallel to each other. Then the central plane of each winded coil exists, so that a winding turn is always located at each side of or in the central plane. Further, an equal number of winding turns can be arranged at each side of the center plane and the coil can be substantially flat, i.e. the depth of each coil perpendicular to the center plane can be small compared to the length and width of the coil, in particular be less than 1/5 of the length and width of the coil.

Each antenna portion can comprise a winded coil, the winding turns of which have substantially a circular or rectangular, in particular a square, shape.

In order to be able to control receiving and transmitting to a certain antenna portion or coil which is located in the best way in relation to an exterior, stationarily arranged antenna with which the transponder cooperates, a level detector can be provided for each separate antenna portion and it then provides suitably a signal to the control and transmission unit which represents some suitable intensity measure, for example the amplitude, of the oscillation received in the antenna portion. The control and transmission unit then comprises advantageously comparing means connected to the level detectors for comparing the signals therefrom and control means that ensure that in transmitting from the transponder that antenna portion is used for which the comparing means indicate or have indicated that the largest amplitude existed in receiving that electromagnetic wave on the antenna which contains the energy which is to be used for the transmission. The control means can further ensure that in transmitting from the transponder also that antenna portion is used, for which the comparing means indicate that next to the largest amplitude existed in receiving the energy used for the transmission.

Oscillatory circuit capacitors are suitably connected in parallel with each antenna portion for forming an oscillator and filter circuit together with the antenna portion and the inductance thereof. Each antenna portion is in that way included in a filter and oscillatory circuit of its own. Therein a self generated oscillation can be started having an own natural or resonant frequency by applying a voltage pulse over the circuit, where the energy of the voltage pulse is taken from the energy storage unit. The control and transmission unit can then periodically apply voltage pulses over the filter and oscillatory circuit having a frequency that is substantially equal to an even fraction of the natural frequency, whereby an oscillation having a frequency substantially equal to the natural frequency can be maintained in the filter and oscillatory circuit.

By arranging components having variable characteristics such as oscillatory circuit capacitors having variable capacitances or by the fact that the capacitors each one comprises a plurality of capacitors that can be connected in a controlled way, the filter and oscillatory circuits can be made controllable to a plurality of different natural frequencies, in the preferred case two different natural frequencies. The control and transmission unit can then as above control the application of voltage pulses to the oscillator and filter circuits with frequencies which are substantially an even fraction of each one of the different natural frequencies, dependant on the frequency that is instantaneously valid. An even fraction is here taken to mean that the higher frequency corresponds essentially to an integer multiple of the lower frequency.

The filter and oscillatory circuit can for arranging two different natural frequencies comprise a first capacitor that is directly and permanently connected in parallel with the antenna portion or the coil, and a second capacitor, which is arranged to be connected, in a controlled way by applying a control signal from the control and transmission unit, in parallel with the first capacitor.

BRIEF DESCRIPTION OF THE DRAWINGS

The invention will now be described in greater detail with reference to non limiting, particular embodiments and with reference to the accompanying drawings, in which.

DESCRIPTION OF PREFERRED EMBODIMENTS

Figure 1A:
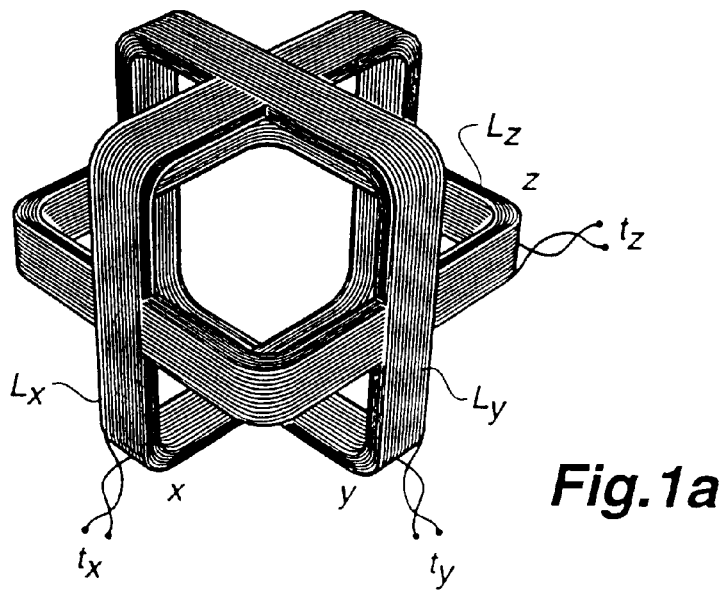
FIGS. 1a and 1b are schematic perspective views of two different embodiments of an antenna system for a transponder.

In FIG. 1a an antenna system for a transponder is illustrated that comprises three separate antenna windings, an antenna winding $L_x$, the winding turns of which all are located in parallel with an x-coordinate plane, an antenna winding $L_y$, the winding turns of which all are located in parallel with a y coordinate plane, and an antenna winding $L_z$, the winding turns of which are located in parallel with a z-coordinate plane. Each antenna winding $L_x$, $L_y$, $L_z$ comprises a number of turns of an isolated electric conductor, which are located close to each other, so that a coil is formed having a rather small height or width. Each coil has a symmetry plane that passes through the central winding turns in the coil. Further, from the antenna windings the ends of the electric conductors continue in the shape of connector conductors $t_x$, $t_y$, $t_z$, to be connected to electronic circuits which will be described hereinafter. Each winding $L_x$, $L_y$, $L_z$ has in the embodiment illustrated in FIG. 1a a rectangular shape, for example a square shape, whereas according to the embodiment of FIG. 1b each winding is substantially circular. In the latter figure the connector wires are not shown. What is essential for the function is that each winding is substantially identical and that the three coils are located substantially perpendicularly to each other, though rather great deviations may be allowed from this configuration. In the embodiments shown in FIGS. 1a and 1b also said symmetry plane extending through the central winding turns in an antenna winding is another symmetry plane of each one of the other antenna windings, this symmetry plane being perpendicular to the corresponding antenna coil. In the case of square antenna coils these other symmetry planes extend through the center of opposite sides of the square configuration.

Figure 1B:
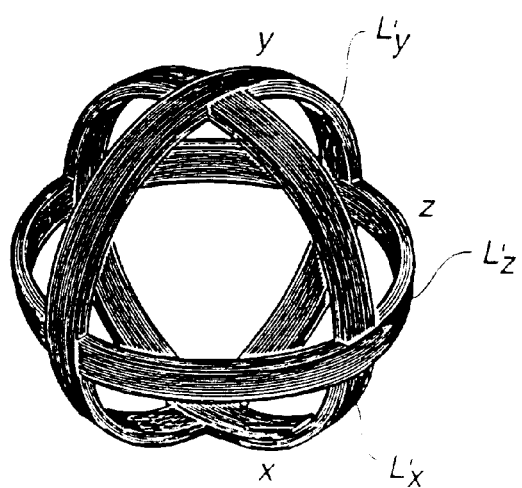
Figure 2:
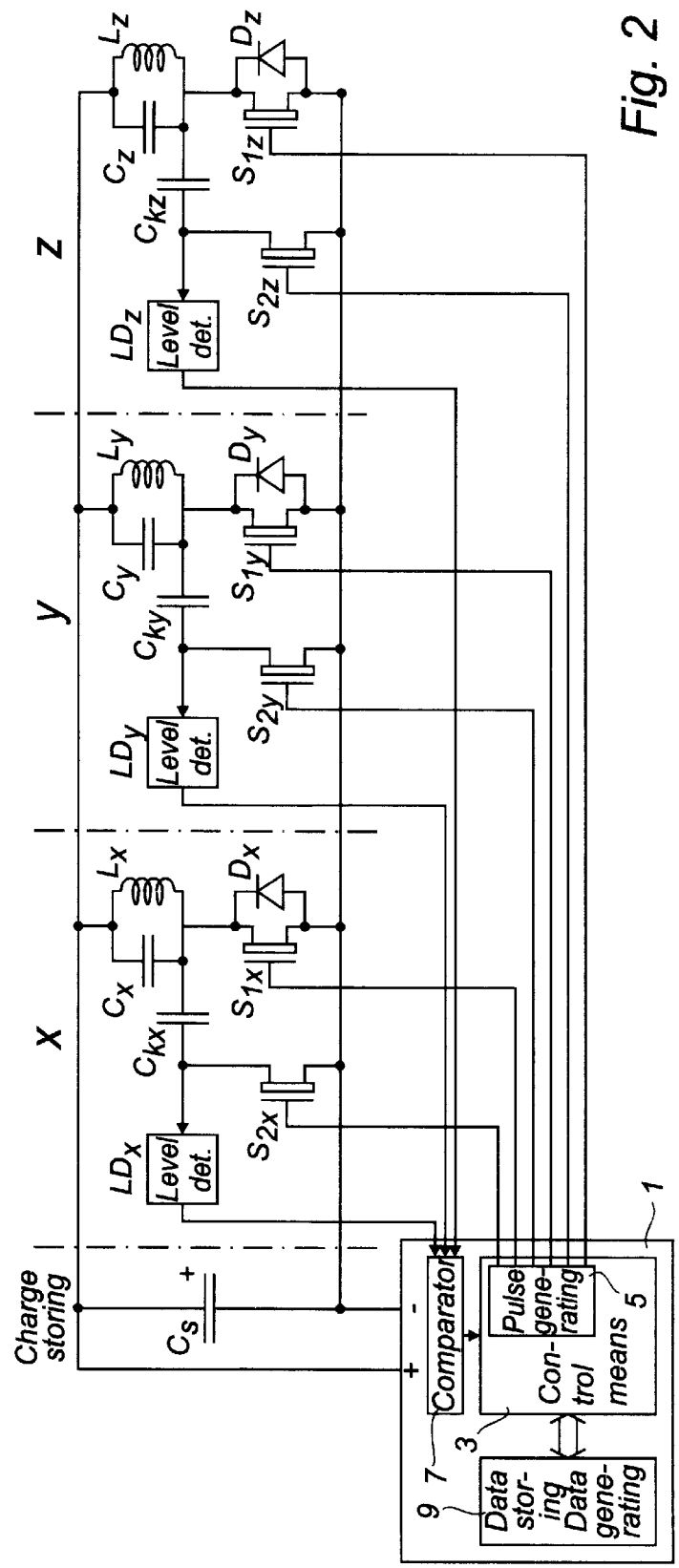
FIG. 2 is a circuit diagram of electronic circuits to be used together with the antenna system of FIGS. 1a or 1b.

When an antenna of the kind illustrated in FIGS. 1a and 1b passes through or at an antenna of a transponder reading station, not shown, which normally issues a wave of a suitably high frequency, in each one of the windings $L_x$, $L_y$, $L_z$ voltages having different magnitudes are induced. In order to use these different voltages the connector wires $t_x$, $t_y$, $t_z$ are coupled to suitable circuits shown in the circuit diagram of FIG. 2.

Thus, in parallel with each antenna coil or winding $L_x$, $L_y$, $L_z$ capacitors $C_x$, $C_y$, $C_z$ are connected, so that the antenna winding together with the capacitor forms a suitable oscillatory circuit or a corresponding band pass filter tuned to the frequency of the electromagnetic wave emitted by the interrogation station. One side or one terminal of the filters or the oscillatory circuits formed by the antenna loops together with corresponding capacitors are connected to the first side or the first electrode of a storage capacitor $C_s$ and the other side of the oscillatory circuits are through diodes $D_x$, $D_y$, $D_z$ connected to the second plate or electrode of the storage capacitor $C_s$. Thereby a storage capacitor $C_s$ will be charged at each half period of an induced voltage which has one of the possible polarities, up to a peak voltage which is equal to the amplitude of the largest induced AC voltage.

Further, the two electrodes of the storage capacitors $C_s$ are connected to a central control and transmission unit or control circuit 1, which comprises suitable logical circuits and which obtains its supply voltage exactly from these terminals of the storage capacitor $C_s$. The connection points of one terminal of the antenna windings $L_x$, $L_y$, $L_z$ and the diodes $D_x$, $D_y$, $D_z$ are through decoupling capacitors $C_{Kx}$, $C_{Ky}$, $C_{Kz}$ connected to level detectors $LD_x$, $LD_y$, $LD_z$. The decoupling capacitors have a suitably adapted capacitance, so that they work substantially as short circuits for the AC voltage induced in the oscillatory circuit, which is thus transferred to the inputs of the level detectors. The level detectors $LD_x$, $LD_y$, $LD_z$ sense in some known manner the amplitude of the electric voltages received in the antenna coils $L_x$, $L_y$, $L_z$, for example their rectified mean or peak value, and thus delivers DC voltage signals on their outputs through connection lines to the control circuits 1. The control circuits evaluate these signals and determine the antenna coil $L_x$, $L_y$, $L_z$, which provides the largest input signal.

For issuing information from the transponder, according to a preferred embodiment, only that one of the antenna coils $L_x$, $L_y$, $L_z$ which has been determined to give the largest induced voltage from the reading station is used. Therefor first semiconductor switches $S_{1x}$, $S_{1y}$, $S_{1z}$ are connected in parallel with the diodes $D_x$, $D_y$ and $D_z$ respectively, for example suitable field effect transistors. These first switches thus have a first interruption terminal coupled to one side of the oscillatory circuits and a second interruption terminal coupled to the second electrode of the storage capacitor $C_s$. Further, second conductor switches or transistor switches $S_{2x}$, $S_{2y}$, $S_{2z}$ are connected in the connection line between the decoupling capacitors and the second side of the storage capacitors $C_s$, i.e. in parallel with the first semiconductor switches. The gates of the switches are all connected to the control circuits 1.

When transmitting from the transponder that one of the first switches $S_{1x}$, $S_{1y}$, $S_{1z}$ is used, which is connected to the antenna winding $L_u$, u=x, y or z, that has given the largest input signal, by applying a suitable voltage to the gate of this switch. The charge capacitor $C_s$ is then discharged through the antenna coil $L_u$, i.e. a voltage pulse is obtained over the oscillatory circuit, the energy being drawn from the storage capacitor $C_s$. Thereby a natural oscillation is started in the electric oscillatory circuit formed by the antenna winding $L_u$ and its associated capacitor $C_u$, the frequency of the resonant oscillation being equal to the resonant frequency of the circuit. Such activation pulses, produced by closing the switch $S_{1u}$ for short periods, can be applied approximately in the same rhythm as that of the oscillation rhythm but these pulses need only to occur in a lower frequency, so that the activation pulses occur only approximately at each m:th pulse of the resonant oscillation, where m is an integer larger than 1, for example equal to four. The integer m can be a not too large integer such as some integer in the interval of [3, 16] having a most preferable value in the interval [3, 8].

Further, that switch $S_{2u}$ among the second switches $S_{2x}$, $S_{2y}$, $S_{2z}$, which is associated with the activated antenna winding $L_u$, can also be closed during the forced oscillation, by applying a suitable signal to its gate terminal from the control circuit 1. The decoupling capacitor $C_{Ku}$ will then be connected or seem to operate in parallel with the capacitor $C_u$ in the oscillatory circuit due to the fact that the storage capacitor $C_s$ has a large capacitance and works as a short circuit for the actual oscillator frequencies. When the decoupling capacitor is connected, the capacitance in the oscillatory circuit will be larger and a lower natural frequency is obtained compared to the case where it is not connected. However, it can be selected, so that it still is approximately an even multiple of the frequency with which the activation pulses are applied, e.g. equal to three times that frequency. In that way the oscillatory circuit can in a simple way be arranged to have two different resonant frequencies. For the examples given above comprising natural frequencies corresponding to four and three times the frequency of the activation pulses, it is obtained that the capacitance of the decoupling capacitors should be one third of the capacitance of the capacitors connected in parallel with the antenna coils.

From the antenna coil $L_u$ in the resonant oscillation of the selected oscillatory circuit electromagnetic high frequency energy is issued, which can be detected by the stationary antenna installation with a good efficiency since it is issued by the antenna coil that with the largest intensity has received energy from the antenna of the stationary installation and therefore with the largest possibility also will provide the emitted energy which is most easily detected. The emitted energy can further, according to the discussion above, be given to different frequencies by a periodic activation of the first switch with or without the second switch in a closed position. It will in addition provide a detection of logical transitions between two levels, i.e. between two frequencies, what is significantly more secure than the case where only one frequency is used.

The control logical circuits 1 can also determine a priority order of the coils with the corresponding intensity values of the energy received thereon. Then, also emission from all coils can be made and the emitted amounts of energy can be controlled corresponding to the determined intensity values. However, it can require a considerably more complex control scheme. A simpler alternative can be to activate only those two oscillatory circuits, for the antenna coils of which the largest received intensity values have been determined, and that this activation is made with the same intensity for the two selected oscillatory circuits.

The control circuits 1 comprise as their main portion a logical control means 3 which contains a suitable control program and further pulse generating circuits 5 connected to the switches $S_{1x}$–$S_{2z}$ for delivering control signals thereto. The pulse generating circuits 5 can contain an own oscillator, not shown, and suitable dividing circuits in order to obtain different suitable pulse frequencies for control of the oscillation in the oscillatory circuits of the antenna portions. The control means also receives a control signal from a comparator 7, to which the signals from the level detectors $LD_u$ are provided. The control signal indicates the order of magnitude of the energy received in the different oscillatory circuits. The control means 3 is also connected to a data unit 9 that can contain suitable memories and possibly a measuring unit for generating information of interest that is to be transferred to a reading station.

What is claimed is:

1. A transponder for receiving high frequency energy which is wirelessly transferred and for wirelessly transmitting information, comprising:

an antenna for receiving and transmitting;

an energy storage unit connected to the antenna for storing high frequency energy which is transferred wirelessly to the transponder and is received on the antenna; and a control and transmission unit for transferring an information signal to the antenna to be transmitted from the antenna using energy stored in the energy storage unit, wherein the antenna comprises at least two separate antenna portions, each one of which is arranged for wireless receiving and wireless transmitting, has a direction in which the efficiency for receiving is at a maximum and works independently of the other antenna portions, the directions being arranged in angular relation to each other.

2. A transponder according to claim 1, wherein said antenna includes three separate antenna portions, each having a direction for maximum receiving, which are all oriented at substantially 90° angles in relation to each other.

3. A transponder according to claim 1, wherein each antenna portion comprises a winded coil having winding turns, the winding turns of each winded coil being located in planes which are substantially parallel to each other.

4. A transponder according to claim 3, wherein a center plane is arranged for each winded coil, so that the winding turns of each winded coil are located at one of the sides of or in the center plane of the winded coil and so that an equal number of winding turns are located on each side of the center plane, and the depth of each winded coil taken perpendicularly to the center plane of the winded coil is small compared to the length and width of the winded coil.

5. A transponder according to claim 4, wherein the depth of each winded coil is less than $1/5$ of the length and width of the winded coil.

6. A transponder according to claim 1, wherein each antenna portion comprises a winded coil having winding turns, the winding turns of each winded coil having substantially circular shapes.

7. A transponder according to claim 1, wherein each antenna portion comprises a winded coil having winding turns, the winding turns of each winded coil having substantially rectangular shapes.

8. A transponder according to claim 1, further including a level detector for each separate antenna portion, which level detector is arranged to provide a signal to the control and transmission unit which signal represents the amplitude of an oscillation obtained when receiving in the antenna portion high frequency energy which is wirelessly transferred to the transponder.

9. A transponder according to claim 8, wherein the control and transmission unit comprises comparing means connected to the level detectors for comparing the signals provided by the level detectors with each other and control means for using, when wirelessly transmitting information from the transponder, that one of the antenna portions for which a result of the comparing in the comparing means indicates that the largest amplitude existed when receiving the high frequency energy.

10. A transponder according to claim 8, wherein the control means are arranged to also use, when the transponder wirelessly transmits information, that antenna portion, for which result of the comparing in the comparing means indicates that the next to largest amplitude existed when receiving the high frequency energy.

11. A transponder according to claim 1, further including a plurality of oscillatory circuit capacitors, each one of which is connected in parallel with only one of the antenna portions.

12. A transponder according to claim 1, wherein each antenna portion is electrically connected in a filter and oscillatory circuit, each filter and oscillatory circuit being arranged to have a natural oscillation which has a natural frequency and which can be started by applying a voltage pulse over the circuit.

13. A transponder according to claim 12, wherein the control and transmission unit, when wirelessly transmitting information from the transponder, is arranged to periodically apply voltage pulses over at least one of the filter and oscillatory circuits with a frequency substantially equal to an even fraction of the natural frequency.

14. A transponder according to claim 12, wherein the filter and oscillatory circuits are controllable to oscillate at two different natural frequencies.

15. A transponder according to claim 1, wherein said angular relation between said antenna portions is substantially 90 degrees.

16. A transponder according to claim 1, wherein each antenna portion is connected to a storage capacitor for storing received high frequency energy.

17. A transponder according to claim 1, wherein each antenna portion is connected in an oscillatory circuit which is tuned to the frequency of high frequency energy which is transferred wirelessly to the transponder.

18. A transponder for receiving high frequency energy which is wirelessly transferred to the transponder for wirelessly transmitting information, the transponder comprising:

an antenna for receiving and transmitting;

an energy storage unit connected to the antenna for storing high frequency energy which is transferred wirelessly to the transponder and is received on the antenna; and a control and transmission unit for transferring an information signal to the antenna to be transmitted from the antenna using energy stored in the energy storage unit;

wherein the antenna comprises at least two separate antenna portions, each one of which is arranged for wireless receiving and transmitting, has a direction in which the efficiency for receiving is at a maximum, works independently of the other antenna portions and is connected to a storage capacitor for storing received high frequency energy, the directions being arranged in angular relation to each other.

19. A transponder for receiving high frequency energy which is transferred wirelessly to the transponder and for wirelessly transmitting information, the transponder comprising:

an antenna for receiving and transmitting;

an energy storage unit connected to the antenna for storing high frequency energy which is transferred wirelessly to the transponder and is received on the antenna; and a control and transmission unit for transferring an information signal to the antenna to be transmitted from the antenna using energy stored in the energy storage unit;

wherein the transponder is arranged to wirelessly transmit information by modulating between two different frequencies.

20. A transponder according to claim 19, further including a filter and oscillatory circuit in which the antenna is electrically connected and which is arranged to have natural oscillations which have natural frequencies and can be started by applying a voltage pulse over the filter and oscillatory circuit with energy drawn from the energy storage unit, the filter and oscillatory circuit being controllable to oscillate at two different natural frequencies.

21. A transponder according to claim 20, wherein the control and transmission unit is arranged to control the application of voltage pulses with such a frequency that each of the two different natural frequencies corresponds to an integer multiple of the frequency at which the voltage pulses are applied.

22. A transponder according to claim 20, wherein the filter and oscillatory circuit comprises a first capacitor which is directly and permanently electrically connected in parallel with the antenna and a second capacitor which is arranged to be electrically connected and disconnected, by a control signal from the control and transmission unit, in parallel with the first capacitor.

* * * * *